United States Patent
Ward

(10) Patent No.: US 7,884,569 B2
(45) Date of Patent: Feb. 8, 2011

(54) HYBRID VEHICLE WITH A LOW VOLTAGE SOLAR PANEL CHARGING A HIGH VOLTAGE BATTERY USING A SERIES CHARGER TO SEPARATELY CHARGE INDIVIDUAL CELLS OF THE SERIES CONNECTED BATTERY

(76) Inventor: Thomas A. Ward, 1146 Larch Ave., Moraga, CA (US) 94556

( * ) Notice: Subject to any disclaimer, the term of this patent is extended or adjusted under 35 U.S.C. 154(b) by 383 days.

(21) Appl. No.: 12/033,591

(22) Filed: Feb. 19, 2008

(65) Prior Publication Data
US 2008/0143292 A1    Jun. 19, 2008

Related U.S. Application Data

(63) Continuation-in-part of application No. PCT/US2006/033166, filed on Aug. 23, 2006.

(60) Provisional application No. 60/710,996, filed on Aug. 24, 2005, provisional application No. 60/714,688, filed on Sep. 6, 2005, provisional application No. 60/816,956, filed on Jun. 27, 2006.

(51) Int. Cl.
*H01M 10/44* (2006.01)
*H01M 10/46* (2006.01)
*H02J 7/00* (2006.01)

(52) U.S. Cl. ............... 320/101; 320/103; 320/104; 180/2.1; 180/2.2; 903/907

(58) Field of Classification Search .......... 320/101, 320/103, 104
See application file for complete search history.

(56) References Cited

U.S. PATENT DOCUMENTS 3,928,791 A * 12/1975 Mullersman ............. 320/119

(Continued)

FOREIGN PATENT DOCUMENTS

EP    0 424 577 A1    5/1991

(Continued)

OTHER PUBLICATIONS

PCT Application PCT/US2006/033166: International Search Report, Nov. 30, 2006.

(Continued)

*Primary Examiner*—Melissa J Koval
*Assistant Examiner*—Samuel Berhanu
(74) *Attorney, Agent, or Firm*—Fliesler Meyer LLP

(57) ABSTRACT

A series charger (80) is provided to charge a high voltage battery (42) in an electric vehicle with a low voltage solar panel (50). The series charger (80) provides switches ($84_1$, $84_2$) to connect the terminals of solar panel (50) across individual battery cells ($34_{1-n}$) in series connected battery (42) one battery cell at a time. Charging by series charger (80) can occur while the cells ($34_{1-n}$) of battery (42) remain connected in series. With the series charger (80), the high voltage battery (42) can be charged by the low voltage solar panel (50) without using a lossy DC-DC converter. The high voltage battery (42) charged by series charger (80) can be connected in parallel with a second high voltage battery to enable charging all cells of the second battery together. The solar panel (50) can be provided in a moon roof or truck bed cover adjustable to track the sun.

7 Claims, 12 Drawing Sheets

U.S. PATENT DOCUMENTS

| | | | |
|---|---|---|---|
| 4,090,577 A | | 5/1978 | Moore |
| 4,489,242 A | | 12/1984 | Worst |
| 4,602,694 A | * | 7/1986 | Weldin .................. 180/2.2 |
| 5,617,004 A | | 4/1997 | Kaneko |
| 5,905,356 A | | 5/1999 | Wells |
| 5,908,077 A | | 6/1999 | Moore |
| 6,448,740 B1 | | 9/2002 | Kirkpatrick |
| 6,583,522 B1 | | 6/2003 | McNulty et al. .......... 307/71 |
| 7,068,011 B2 | | 6/2006 | Yang |
| 2002/0101097 A1 | * | 8/2002 | Muller .................... 296/211 |
| 2002/0146617 A1 | | 10/2002 | Johnson |
| 2002/0171390 A1 | * | 11/2002 | Kruger et al. ............ 320/103 |
| 2004/0055632 A1 | | 3/2004 | Mazumder |
| 2005/0057215 A1 | * | 3/2005 | Matan .................... 320/101 |
| 2005/0083722 A1 | | 4/2005 | Emori |

FOREIGN PATENT DOCUMENTS

| | | |
|---|---|---|
| ES | 2 135 318 A1 | 10/1999 |
| FR | 2 855 793 A | 12/2004 |
| JP | 05 111112 A | 4/1993 |
| JP | 11 028991 A | 2/1999 |
| JP | 11 227548 A | 8/1999 |
| JP | 2000 174308 A | 6/2000 |
| JP | 2004 221521 A | 8/2004 |
| WO | WO 2004/049540 A2 | 6/2004 |
| WO | WO 2007/025096 A1 | 3/2007 |

OTHER PUBLICATIONS

PCT Application PCT/US2006/033166: Written Opinion of the International Searching Authority, Nov. 30, 2006.

PCT Application PCT/US2006/033166: Amendment Under PCT Article 19, filed Jan. 26, 2007.

PCT Application PCT/US2006/033166: Letter Reply to Written Opinion, filed May 4, 2007.

PCT Application PCT/US2006/033166: Notification Concerning Informal Communications with the Applicant, Dec. 21, 2007.

PCT Application PCT/US2006/033166: Written Opinion of the International Preliminary Examining Authority, Dec. 21, 2007.

PCT Application PCT/US2006/033166: Response to Written Opinion Under PCT Rule 66.3 with Amendment Under PCT Article 34, filed Jan. 4, 2008.

PCT Application PCT/US2006/033166: International Preliminary Report on Patentability, Feb. 7, 2008.

Green Car Congress, "Solar-Power-Augmented Prius Takes the Grid Out of "Plug-In"", Aug. 15, 2005, http://www.greencarcongress.com/2005/08/solarpoweraugme.html, pp. 1-2.

Yahoo! Autos Groups, Priusplus. Prius+ Plug-In Hybrid Conversion Group, blog posted Jan. 20, 2005, http://autos.groups.yahoo.com/group/priusplus/post "Re: Another Prius +: a whole new possibility," pp. 1-12.

Stanford News Service, News Release, Aug. 7, 2001, "Students race Route 66 in world's longest solar car challenge," pp. 1-3.

* cited by examiner

Solar Panels

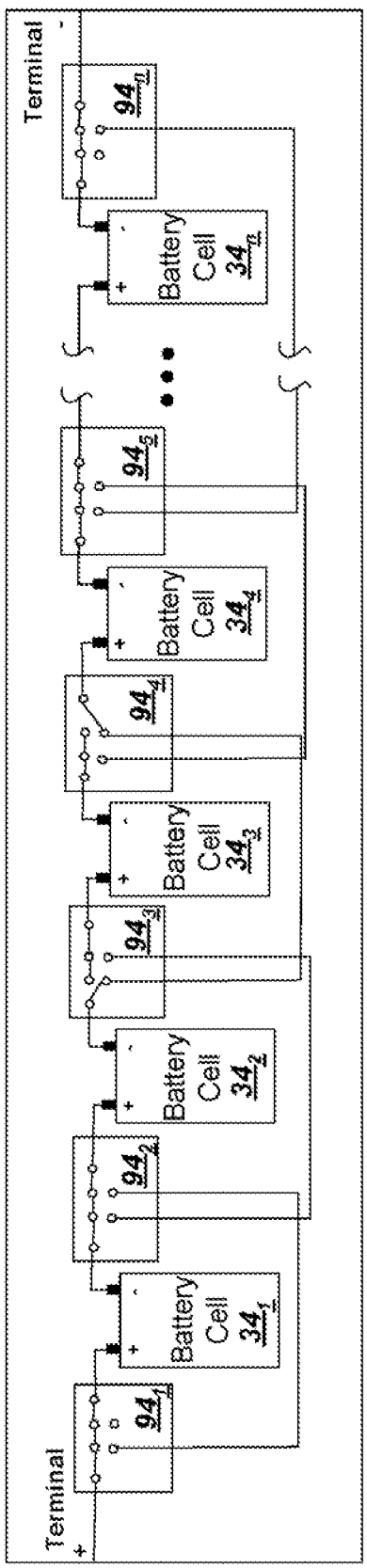
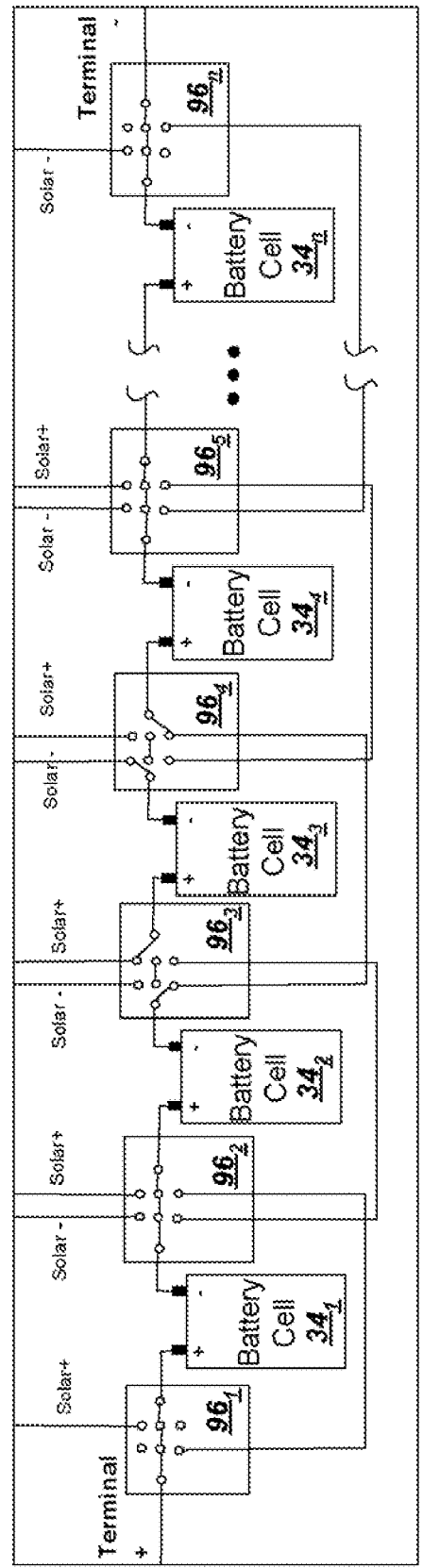
FIG. 16
FIG. 17

HYBRID VEHICLE WITH A LOW VOLTAGE SOLAR PANEL CHARGING A HIGH VOLTAGE BATTERY USING A SERIES CHARGER TO SEPARATELY CHARGE INDIVIDUAL CELLS OF THE SERIES CONNECTED BATTERY

CLAIM OF PRIORITY

This application is a Continuation-In-Part under 35 U.S.C. 111(a) of PCT Patent Application Number PCT/US2006/033166, with filing date 23 Aug. 2006, entitled "Hybrid Vehicle With Modular Solar Panel and Battery Charging System To Supplement Regenerative Braking," which claims priority to U.S. Provisional Application Ser. No. 60/710,996 filed Aug. 24, 2005, U.S. Provisional Application Ser. No. 60/714,688 filed Sep. 6, 2005, and U.S. Provisional Application Ser. No. 60/816,956 filed Jun. 27, 2006, all of which are incorporated herein by reference in their entirety.

BACKGROUND

1. Technical Field

The present invention relates to a system for increasing the battery life for an electric vehicle. More particularly, the present invention relates to a system for increasing the fuel mileage for a hybrid vehicle by using solar energy.

2. Related Art

Electric vehicles are typically driven by charge stored in a battery, with the battery charged by an AC outlet plug in system. Hybrid vehicles are driven by a combination of a battery powered electric motor and a fuel burning motor. Batteries of the electric motor in either drive system can be recharged by regenerative braking to increase the miles the vehicle can travel per charge for a battery powered system alone, or the miles per gallon the vehicle can travel for a hybrid system. It is desirable to provide additional systems to charge the battery to increase the battery life for an electric vehicle, or the fuel mileage of a hybrid vehicle.

SUMMARY

Embodiments of the present invention provide a system for charging a vehicle battery using one or more modular solar panels. The solar panels in some embodiments are included in a moon roof or a truck bed cover. The moon roof and truck bed cover provide a modular alternative to prior art solar panels that attach directly to the surface of vehicle panels or that are provided on a large flat panel attached to the roof of a vehicle, as the modular moon roof and truck bed cover can be easily installed and replace a common vehicle component. With the moon roof or truck bed cover, an angle adjustment mechanism can further be included to direct their solar panels toward the sun. In other embodiments, modular solar panels are provided that are easily removable by being attached to components such as a sunshade, roof rail cross bar removable slide attachments, or a clamp on roof top carrier.

Hybrid systems typically operate with a high voltage battery, some on the order of 300 volts. A conventional low cost silicon solar cell of one square inch ($2.5^2$ centimeters) can produce approximately 0.5 volts. Solar cells connected in series to charge a battery on the order of 300 volts would occupy an area much larger than the moon roof, or even a truck bed cover. Accordingly, some embodiments of the present invention provide for charging a high voltage system (such as a 300 volt system) with a low voltage solar panel (such as a 12 volt solar panel). In one embodiment, the low voltage solar panel to high voltage battery charging system includes a DC-DC converter. In other embodiments, the low voltage solar panel to high voltage charging system includes a series charger, enabling the solar panel to charge series connected battery cells, one cell at a time.

The series charger is formed in one embodiment with wires connecting the solar panel in parallel directly across one or more series connected battery cells in a battery pack. This avoids the inefficient transformer in a DC-DC converter used in prior art systems for charging all cells of a high voltage battery at one time. The solar panel series charging system can include switches to connect the solar panel sequentially to each series connected battery cell, one cell at a time.

In some embodiments, the series battery charging system can further include switches that disconnect all of the series connected battery cells when the electric motor is not operational and connect the solar panel in parallel with all of the battery cells to enable concurrent charging of the battery cells. The series battery charging system can further include an additional redundant battery cell with switches included to bypass the redundant cell if another cell is damaged or otherwise becomes non-functional.

In further embodiments, an additional battery can be provided in parallel with the regenerative braking charged battery, with the additional battery buffered so that it is charged only by the solar panel. Cooling of the additional battery, necessary when charging by regenerative braking in prior art systems, will thus not be required. Further the additional battery can allow a series charger to charge the additional battery, while effectively charging all of the cells of the remaining regenerative braking charged battery at one time.

In further embodiments, a controller is provided to connect the solar panel to directly power low voltage vehicle components instead of using the low voltage vehicle battery when sufficient solar power is provided. Further embodiments include an AC wall outlet plug in charger for charging the battery that shares components with the solar charging system.

BRIEF DESCRIPTION OF THE FIGURES

Further details of the present invention are explained with the help of the attached drawings in which:

FIG. 16 illustrates an embodiment for a series battery charger to disconnect and bypass a battery cell to provide a redundant battery that can be reconnected if a battery cell fails;

FIG. 17 illustrates modification of the embodiment of FIG. 15 to enable switches to connect the solar cell to charge the disconnected battery;

DETAILED DESCRIPTION

I. Modular Solar Panels

The solar panels in some embodiments of the present invention are provided as modular units that replace vehicle components. Such modular panels include a moon roof and a truck bed cover. Other modular panels include solar panels provided on sunshades, roof rail cross bar attachments, or roof top clamp on carriers. The modular solar panels are easy to repair and replace and can be provided as an after market item for a vehicle. Although the solar panels can produce a lower voltage than typically required for charging a high voltage battery pack of the vehicle, charging systems are provided in embodiments of the present invention to allow a low voltage solar panel to charge a high voltage battery.

The solar panels increase fuel mileage of a hybrid vehicle, or increase battery life of an electric vehicle by charging batteries in combination with regenerative braking. The fueled engine used in a hybrid vehicle with embodiments of the present invention can be gasoline, diesel, bio-diesel, natural gas, propane, or steam. In some embodiments, a battery charged electric motor can be used without a separate fueled engine. Also a hydrogen fuel cell can be used to produce electricity for an electric motor separate from the battery, and can thus be used with only an electric motor, with the solar panel powering the separate battery.

A. Moon Roof Solar Panel

Figure 1:
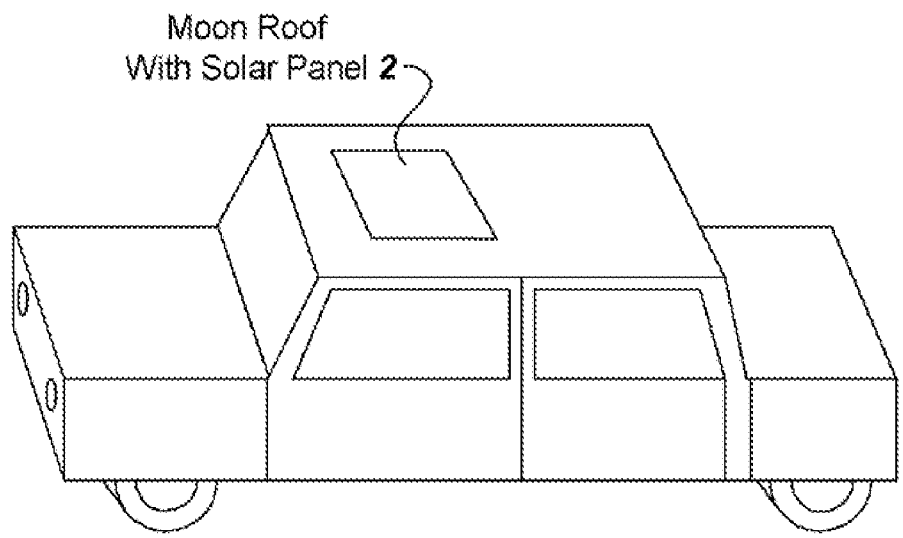
FIG. 1 illustrates a vehicle showing solar panel placement in a moon roof.

FIG. 1 illustrates a vehicle showing a solar panel 2 placed in the moon roof (also called sun roof). The solar cells making up solar panel 2 can be attached beneath the window of the moon roof with a bottom covering supporting the solar cells and covering the electrical lines. The moon roof typically already includes a glass panel, and electrical lines to run a motor to operate the moon roof. Electric cables for the solar panel 2 can be run through the same lines or openings as the motor electrical connections for the moon roof in the vehicle. The moon roof solar panel 2 can, thus, be a stand alone component, and provided either by a vehicle manufacturer or as an after market device. Use of a solar panel 2 in a moon roof will not significantly change the appearance of a vehicle.

Moon roof as described herein includes a device installed in an opening in the roof of a vehicle and can include a transparent cover (glass, Plexiglas, etc.). The moon roof typically fits flush with the surface of the roof to reduce wind resistance. It can be placed above the driver, or farther back above the rear seat passengers, or in both locations. Rubber or other insulating material that seals around the moon roof transparent cover can provide weather protection for the solar cells. The solar cells can be mounted on a panel beneath the moon roof transparent cover and attached to the support mechanism for the moon roof. Alternatively, the moon roof transparent window can be replaced by the solar panel, or the solar panel can be attached either below or above the transparent moon roof window. As a further alternative, an opening can be cut in a roof of a vehicle without a moon roof for installation of the solar panel built into a moon roof.

Figure 2:
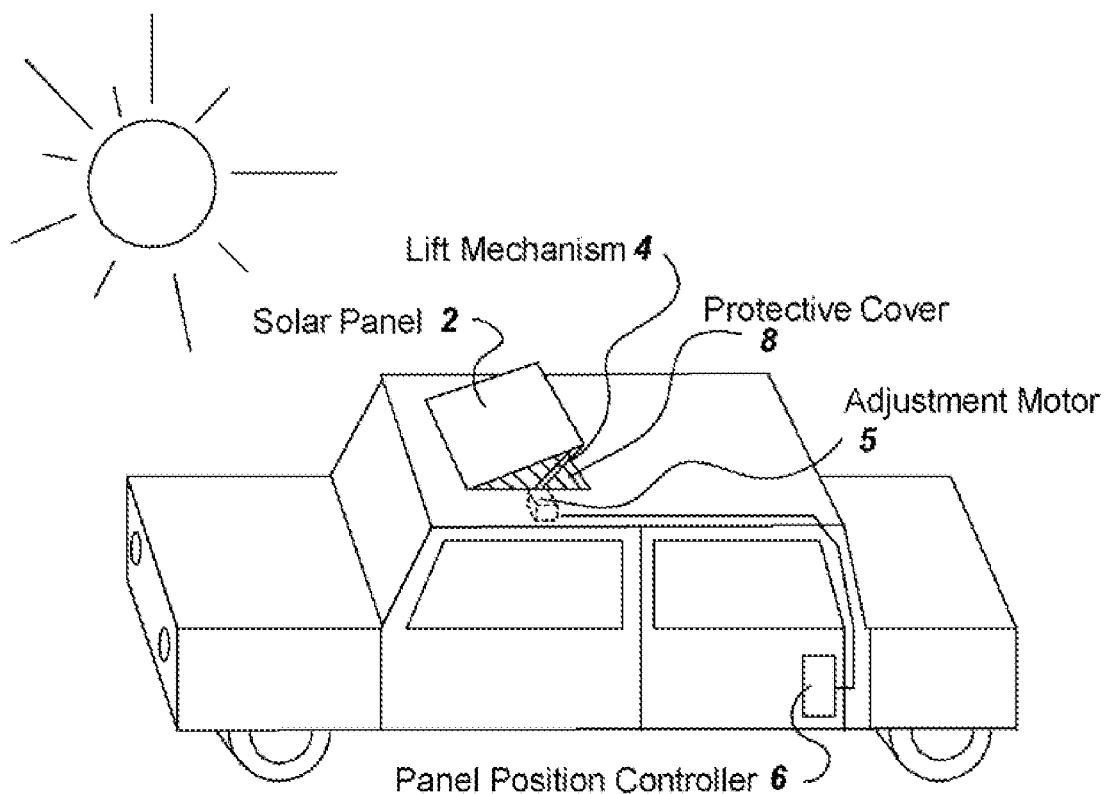
FIGS. 2 and 3 illustrate that an angle adjustment device can be used for the moon roof to direct exposure of the solar panel toward the sun so that maximum power can be generated.
Figure 3:
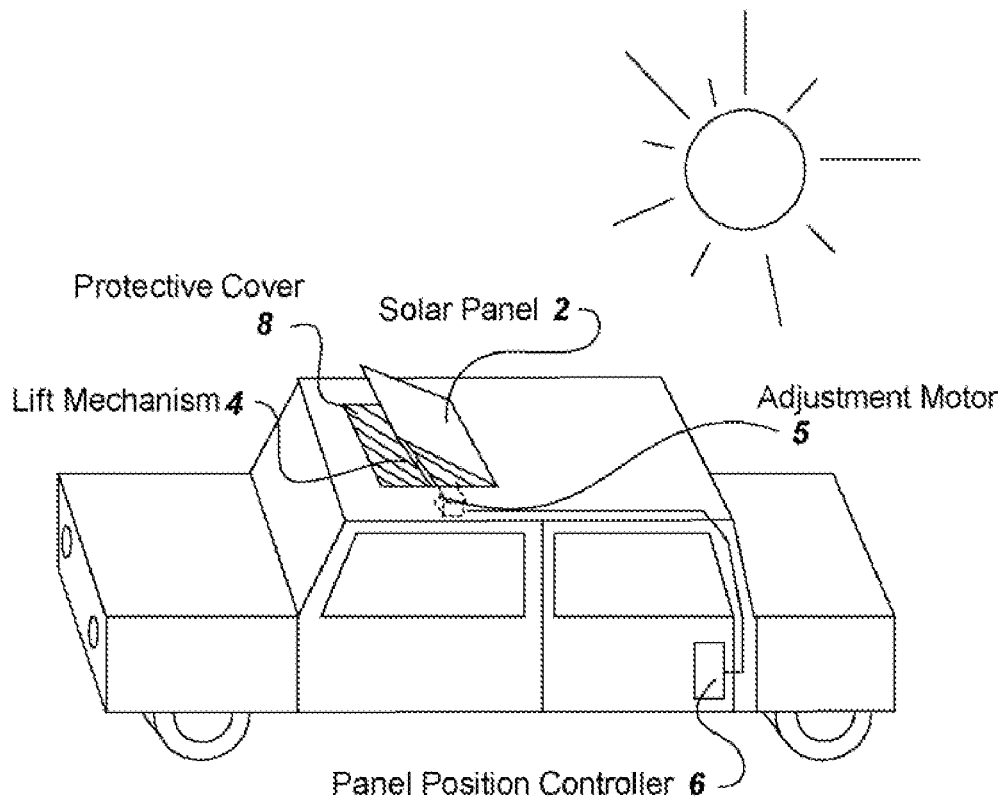

FIGS. 2 and 3 illustrate that an angle adjustment lift mechanism 4 that can be used with the moon roof solar panel 2 to direct exposure of the solar panel 2 toward the sun so that maximum power can be generated. As shown in FIG. 2, the moon roof solar panel 2 can be lifted by an angle adjustment lift mechanism 4 to change its angle using an adjustment motor 5. The motor 5 is controlled by a motor controller 6 that can operate in conjunction with the solar panel controller. The controller 6 is, thus, shown close to a typical hybrid battery and controller placement behind a passenger seat or beneath the floorboard of the vehicle. The solar panel controller in one embodiment includes a power sensor to measure the amount of charge generated at different positions due to the sun position and cause the motor controller 6 to adjust the solar panel 2 to different positions until a position of maximum exposure is obtained. During driving, since the sun can change positions rapidly, the angle adjustment system can put the solar panel 2 in the down position, or optionally readjust at regular intervals. Components such as the motor 5 and adjustment mechanism 4 can be the existing components provided with the moon roof of the vehicle. In one embodiment, the angle adjustment motor 5 and motor controller 6 are eliminated and the adjustment mechanism manually adjusted by an operator.

As further shown in FIG. 2, a cover plate 8 can be included beneath the solar panel 2 to prevent access to the vehicle with the solar panel 2 raised. This will allow solar panel angle adjustment when the vehicle is parked and unmanned, if the operator is concerned about vehicle break in through the solar panel 2. The cover plate 8 can be configured to separately open, particularly if the operator still wants open air flow.

FIG. 3 illustrates that the moon roof solar panel 2 can be adjusted in an opposing manner to face the solar panel toward the rear of the vehicle. The adjustment mechanism of FIG. 3 can be combined with the mechanism of FIG. 2, or used independently. This is an atypical adjustment direction to a normal moon roof since it will scoop air into the vehicle during operation. The mode shown in FIG. 3 is, thus, in one embodiment desirable only when the vehicle is parked.

B. Truck Bed Cover Solar Panel

Figure 4:
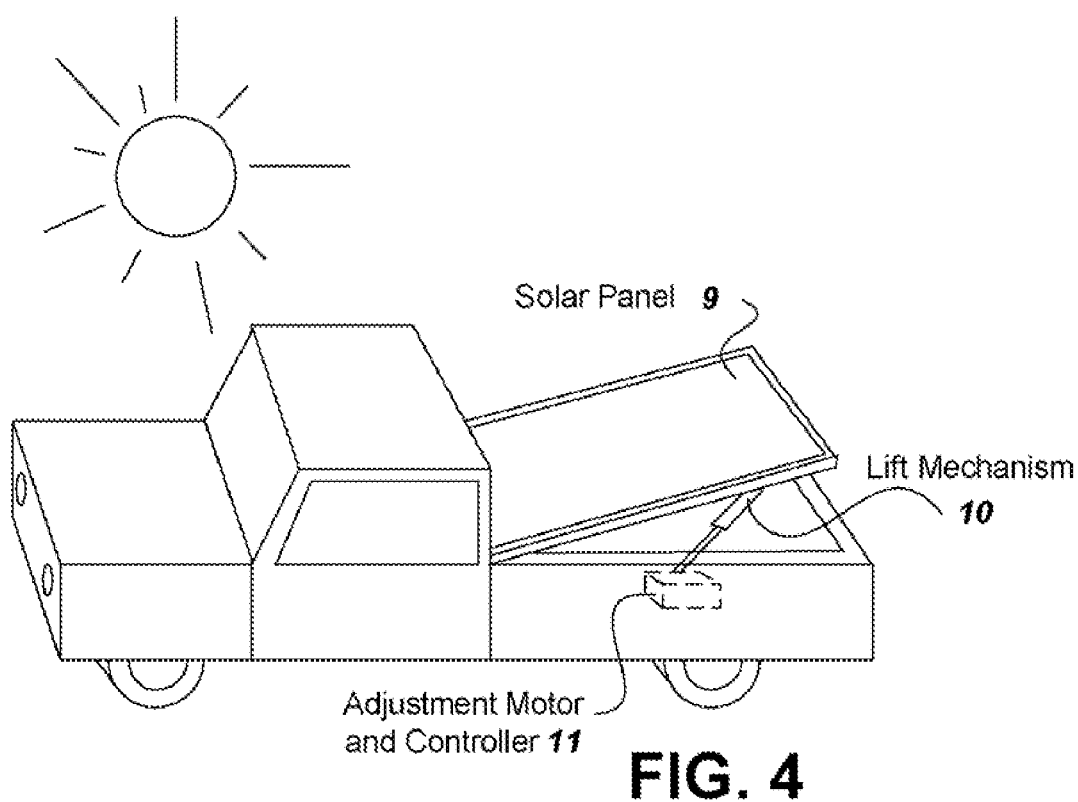
FIG. 4 illustrates solar panel placement on a truck bed cover.

FIG. 4 illustrates solar cell attachment to a truck bed cover to form a modular truck bed cover solar panel 9. The modular truck bed cover solar panel 9 can be easily removed for repair or replacement, and makes the device manufacturable as an after market item for attachment to a truck with an electric engine. The truck bed cover solar panel 9 also provides a large surface area for a solar panel that provides significant charging capability. The truck bed cover solar panel 9 can be used alone, or in combination with other solar panels placed on the truck if additional battery charging power is desired. In one embodiment, electrical connections from the solar panel to a battery for an electric motor include a pluggable connector that can be unplugged so that the truck bed cover with a solar panel 10 can be removed if the truck bed is needed to carry a large load.

The truck bed cover provides a large surface area that can support more solar cells and, thus, provide more charging voltage than comparable solar cells on a moon roof. Accordingly, in one embodiment, the truck bed cover solar panel 9 can charge a battery without requiring a low to high voltage conversion system described subsequently. Further, the truck bed cover solar panel 9 can include an angle adjustment lift mechanism 10 that is operated by motor and controller 11 to adjust the angle to direct the solar panel 9 toward the sun, similar to the moon roof adjustment described in FIGS. 2 and 3. Although the entire truck bed is shown lifted by lift mechanism 10, in one embodiment, a smaller panel on the cover can be lifted, or multiple panels on the truck bed cover can be separately lifted. Further, although a cover beneath the solar panel is not shown in FIG. 4 to protect contents of the truck bed should the solar panel be lifted, it is contemplated that such a cover plate can be used to protect cargo in the truck bed similar to the moon roof cover described previously.

C. Sunshade Solar Panel

Figure 5:
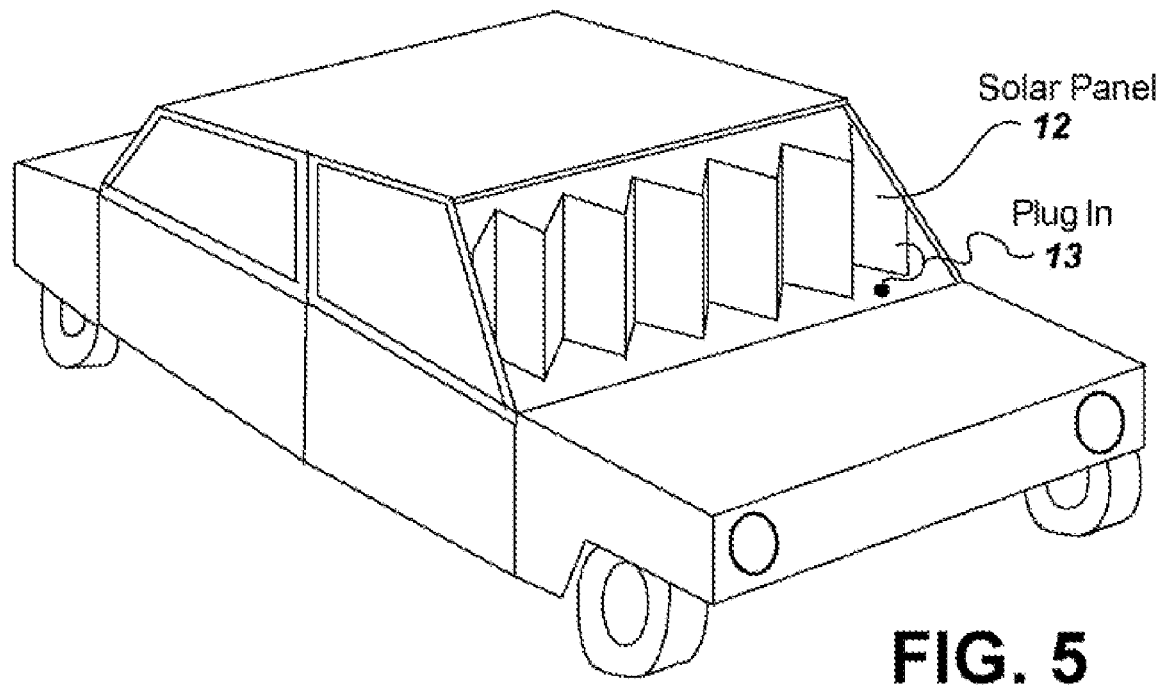
FIGS. 5 and 6 illustrate a solar panel integrally formed in a sun shade that can be plugged into a DC vehicle outlet to charge a battery.
Figure 6:
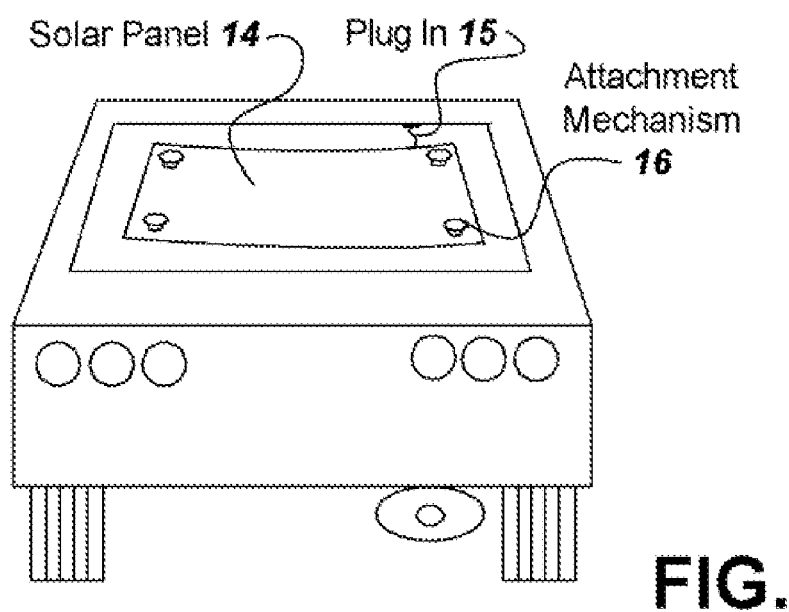

FIGS. 5 and 6 illustrate solar cells attached to a sunshade to form a sunshade solar panel 12. The sunshade can have a plug in cord 13 for plugging into a DC dash outlet to connect to charge a hybrid battery. FIG. 5 illustrates a foldable solar panel sunshade 14 placed behind the front window of a car and supported on the car dashboard. FIG. 6 illustrates a solar panel sunshade 14 providing a different type sunshade that can alternatively be placed in the rear window of a car and connected with a DC plug in 15. FIG. 6 shows attachment of the sunshade solar panel 14 to the rear window using suction cups 16. Although the sunshades have limited surface area, similar to the moon roof solar panel, a low voltage to high voltage charging system can be provided as described subsequently to allow charging of high voltage batteries using the sunshade. Sunshades in combination with the moon roof, or truck bed solar panels can provide significant battery charging when the vehicle is parked. Sunshades provide easy installation of a solar charging system for a hybrid car as an after market component, particularly if the vehicle does not have a moon roof or truck bed. Although the sunshades 12 and 14 are shown with the configurations of FIGS. 5 and 6, other sunshade configurations can be used that might support solar cells such as a roll out or pull down configuration using flexible solar cells.

D. Other Solar Panel Placement Locations

Figure 7:
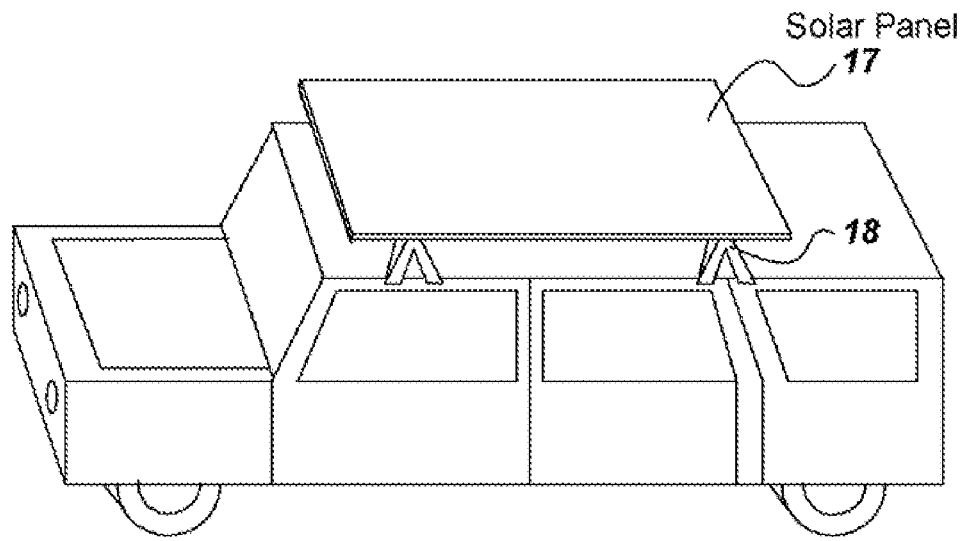
FIG. 7 illustrates a vehicle showing a solar panel attached using a roof top clamp on carrier.

FIG. 7 illustrates a vehicle showing solar panel 17 attachment to a vehicle using a roof top carrier 18. The roof top carrier 18 clamps around the door frame or windows of the vehicle and rests on the vehicle top. A similar device can be used to attach a solar panel to the trunk of a vehicle. A wrap around device, such as a protective hood cover bra can also be used to attach a solar panel to the hood or trunk of a vehicle.

Figure 8:
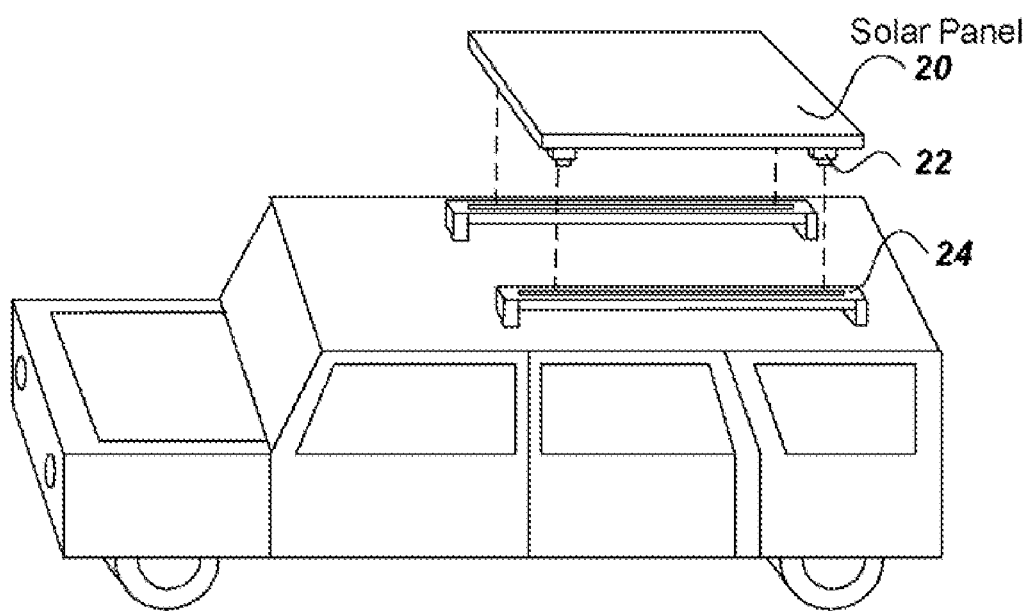
FIG. 8 illustrates a vehicle showing a solar panel attachment to a removable roof rail attachment mechanism.

FIG. 8 illustrates attachment of a solar panel 20 to cross bar attachments 22 for removably attaching to roof rails 24. The solar panel can be integrally formed with the cross bar attachments 22, or attached to the cross bars. The attachments 22 to the roof rails 24 can be lockable slide attachments, or bolt on attachments to roof rail cross bar mounts. The solar panel 20 can have a curved leading edge to connect flush with the surface of the car roof to reduce air drag. As an alternative, the roof rails 24 can be removed, and the attachment blots or other attachment mechanisms used to attach the roof rails 24 can be used to attach the solar panel 20 directly to the roof of the vehicle.

Figure 9:
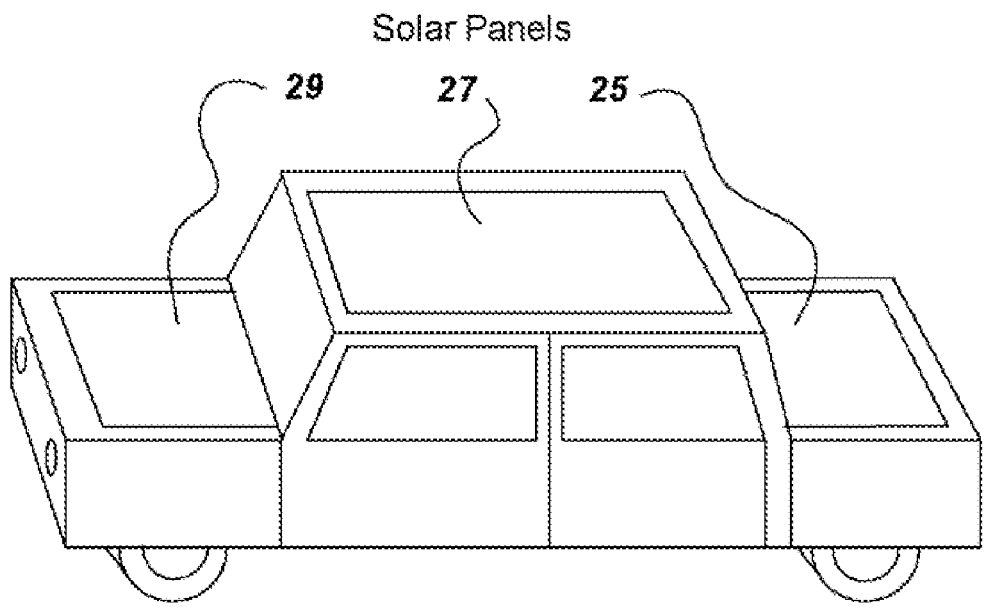
FIG. 9 illustrates a vehicle showing solar panel attachment to a trunk lid, hood, or roof.

FIG. 9 illustrates a vehicle showing solar panel placement in further alternative locations such as the trunk lid 25, roof 27, or hood 29. These solar panels, although not easily detached like the modular panels described previously, can be used in combination with the novel charging system of some embodiments of the present invention. Similar to a trunk, a hatchback can include a solar panel, either in the metal area, or placed beneath a portion of the window. Electrical lines for the solar panels can be run directly through openings for other vehicle electrical lines, such as in the trunk through electrical line openings for the taillights.

Solar panels can likewise be attached to other panels, such as a wing or spoiler of an automobile, a vehicle fender or quarter panel, or to wings of an aircraft that can be used with the novel charging system of some embodiments of the present invention. For all the solar panels discussed, one or more can be used in combination. The panels can be connected in series to provide significant charging voltage. Alternatively, the panels can be connected in parallel to provide significant charging current. The parallel connection may be particularly beneficial with some embodiments of the present invention that provide a series charging system to charge a high voltage battery with a low voltage solar panel.

Solar panels can be beneficial for charging aircraft batteries in a hybrid system. Aircraft typically spend a lot of time parked outside a hanger. Even with a trickle current solar charging system, the aircraft battery can be fully charged for an initial takeoff. Solar panels can also serve to charge batteries during flight, although any regenerative braking to slow the aircraft during descent may be minimal. The solar panels may be particularly beneficial for battery charging where the battery is used to drive small electrical components in the aircraft, rather than powering an engine. With multiple engine systems, the electric motor provides a back up should the fueled aircraft engine fail. An electric motor can be used to power the aircraft as well as to provide the ability to apply braking to slow the aircraft or even turn the propeller backward.

E. Solar Cell Construction and Attachment

For the above described solar panels, the solar panels can be constructed from individual photovoltaic cells (PVCs) made of material such as silicon, gallium-arsenide, a copper alloy, or similar solar cell material electrically connected together to form a solar panel as desired to provide charge for an electric vehicle battery. The solar panel can be rigid, or flexible, and can be formed as light weight thin film material as known in the art.

A protective transparent covering material can be provided such as glass, Plexiglas, or other transparent polymer to protect the solar cells from the elements. In some embodiments, a sealant is used to seal the solar cells between a transparent layer of material and another layer of material to water proof the solar cells. In some embodiments, the solar cells can be encased in a weather sealing material and a separate cover not used.

For the above described embodiments, attachment of the individual solar cells or solar panels can be accomplished using an adhesive material such as an epoxy or other glue.

Attachment can also be accomplished using a magnetic material if later removal is desired. With a glass moon roof, or other nonmagnetic material such as a fiberglass, magnetic material is placed on both sides to attach a solar panel. Alternatively suction cups or clamps can be used to attach to a non-magnetic material.

To make the vehicle more attractive with the solar cells, features such as arrangement of the cells in a design or coloring can be used. The solar cells can be placed in a design pattern to encourage use by its attractiveness (such as making a flower). Wording such as the manufacturer's name can be formed using placement of the solar cells. Coloring can further be applied to the solar cell covering to make it more attractive for the vehicle, such as by matching the vehicle color.

F. Solar Panel Battery Connection and Placement

As indicated previously, batteries for hybrid vehicles are typically placed in locations away from the passengers, such as behind the rear passenger seat, or beneath a floorboard cover. According to some embodiments of the present invention, to store significantly more charge than can be provided by the original vehicle battery for the electric motor an additional battery or batteries can be used. The additional battery can be connected in parallel to supplement the original vehicle battery, or connected in series to form a battery pack sufficient to run a higher voltage motor. The additional battery can be provided in a similar location to the original battery, such as behind a rear passenger seat, or beneath a floorboard cover. Alternatively, with a solar system in a truck bed cover, the additional battery can be provided in the truck bed cover or in a tool box located in the truck bed. Additional batteries can likewise be placed elsewhere in the vehicle, such as in the trunk or under the hood in the engine compartment. With high voltage devices, however, the batteries and connection cables can be separated from areas where vehicle passengers can access for safety. Although the term battery is used, battery as referenced herein is intended to describe either a rechargeable battery, a capacitor bank, a group of interconnected rechargeable batteries, or other charge storage devices.

Figure 10:
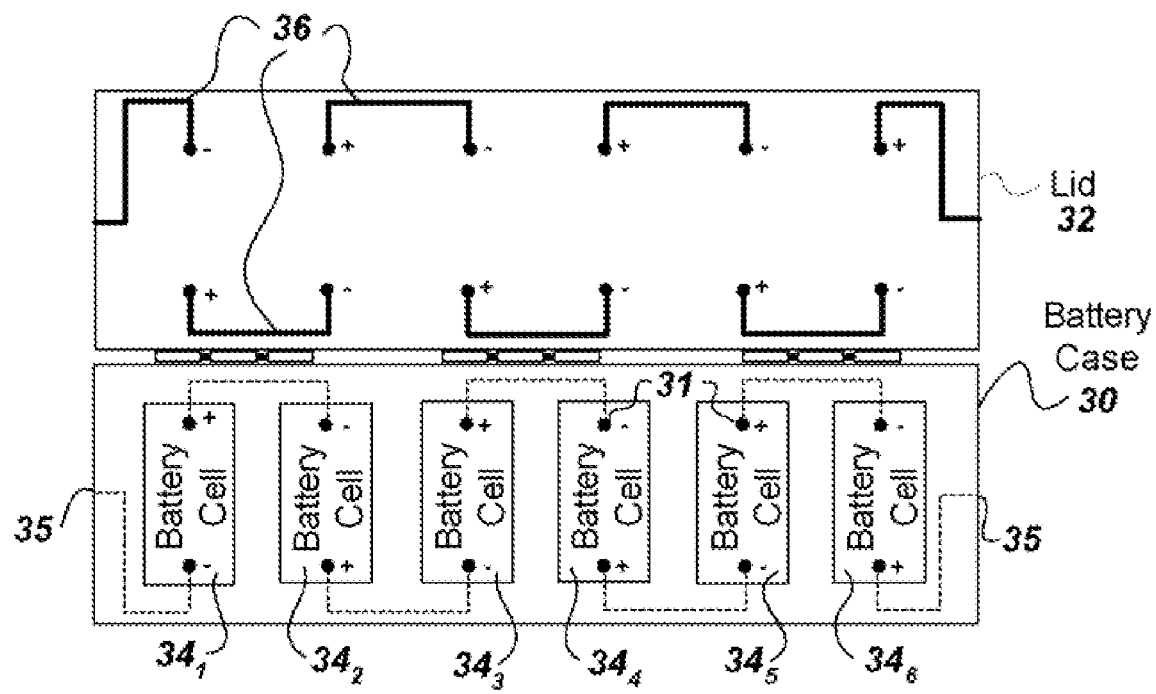
FIG. 10 illustrates a battery case with separate low voltage battery cells connected in series by circuitry on the case lid to provide a high voltage combined battery.

FIG. 10 illustrates a conventional hybrid vehicle battery case 30 with separate low voltage battery cells $34_{1-6}$ connected in series by circuitry on the case lid 32 to provide a high voltage combined battery. The battery pack shown includes a lid 32 with a circuit board having trace connections 36 connecting the cells in series. As an alternative to a circuit board, wiring can be provided in the case lid 32 to make battery connections. Although shown with a circuit board making a series connection in the lid of the battery cell container, it is understood that such a series connection system can be placed in other areas of the battery cell container.

The battery with individual series connected cells $34_{1-6}$ shown in FIG. 10 allows for connection to a solar charging system for charging of the high voltage battery with a low voltage charging system. A DC-DC converter can be connected across the main terminals 35 of the battery for charging the battery with a low voltage solar panel, potentially without removing the battery lid 32. In some embodiments of the present invention described subsequently, a series charger can be used to connect to terminals 31 of the individual battery cells $34_{1-6}$ for charging.

II. Solar Charging Systems

A. System Overview

Figure 11:
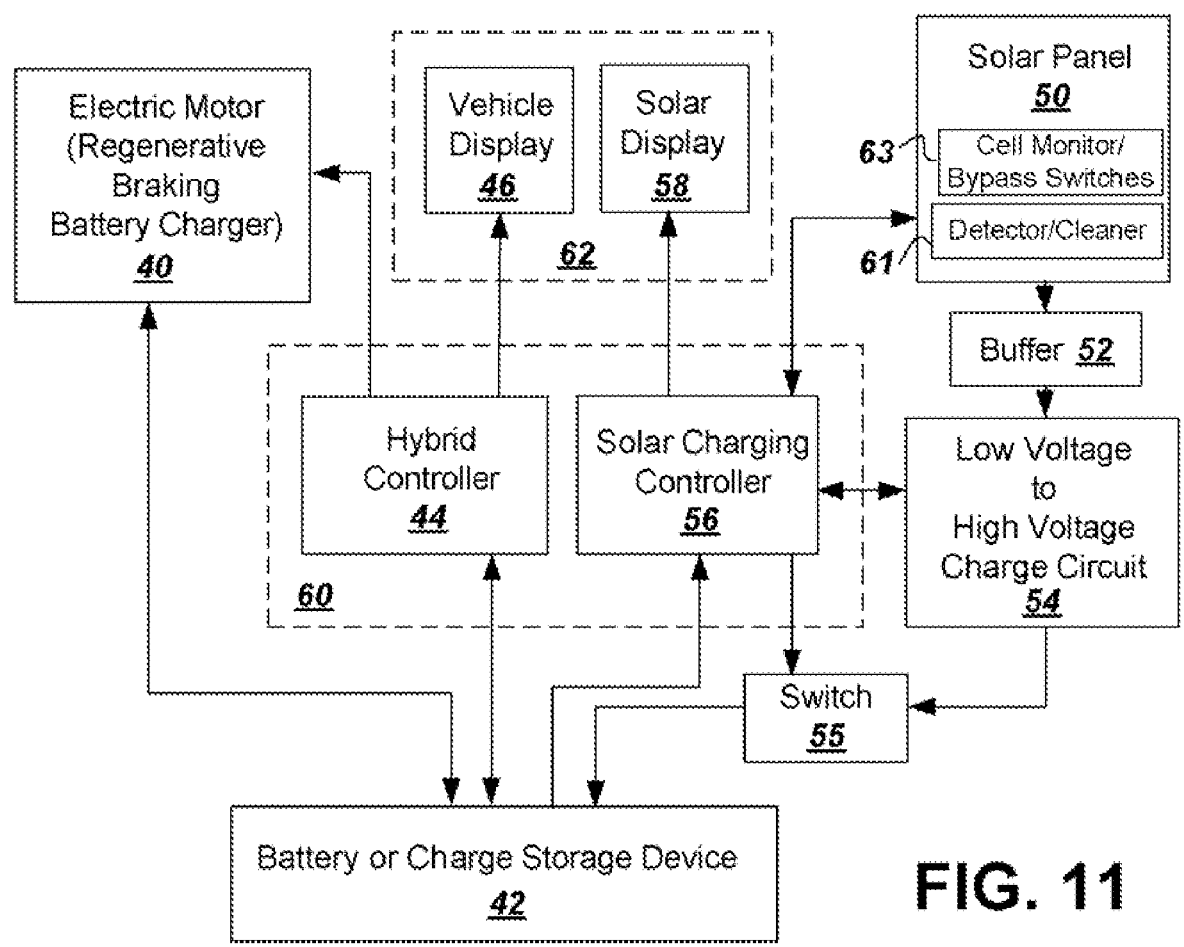
FIG. 11 shows a block diagram for a solar panel battery charging system in combination with a hybrid vehicle battery charging system.

FIG. 11 shows a block diagram of components for a solar panel charging system in combination with a hybrid vehicle electrical system according to embodiments of the present invention. FIG. 11 includes typical hybrid system components, including an electrical motor 40 for powering the vehicle that also provides for regenerative braking to charge batteries 42. The hybrid controller 44 switches the motor 40 so that it can be used to drive the vehicle when battery power is sufficient, and then return to charging the batteries 42 when braking or deceleration of the vehicle occurs. The hybrid controller 44 can monitor charge in the battery 42 and provide a signal to a display 46 to alert a vehicle operator of charge on the battery 42, among other things. The hybrid controller 44 can also control components in the battery 42, such as a cooling fan.

Additionally in FIG. 11, in accordance with some embodiments of the present invention, a solar panel charging system is added to the system to charge the battery 42. Buffering 52 is provided between the solar panel 50 and battery 42 to prevent current from the regenerative braking from damaging the solar panel 50. A low voltage to high voltage charge circuit 54 connects the solar panel 50 to the battery 42 through switch 55. In some embodiments, with sufficient voltage from the solar panel 50, the high voltage to low voltage charge circuit 54 can be eliminated. The switch 55, though shown adjacent the battery 42, can be provided in other locations between the battery 42 and solar panel 50. In some embodiments, such as when overcharge of the battery is not a concern, the switch 55 can be eliminated. As a further embodiment, additional buffering can be provided between the solar panel 50 and the low voltage to high voltage charger 54, particularly if the charger circuit 54 can be damaged from current from the electric motor 40.

The solar controller 56 is further shown in the solar panel charging system, although in some embodiments, such as when controls are provided in circuits such as the charger 54, the solar system controller 56 may be unnecessary. The solar controller 56 can be a processor, an application specific circuit, a programmable logic device, a digital signal processor, or other circuit programmed to perform the functions described to follow.

Initially, the solar controller 56 can control switch 55 to close to allow the solar panel 50 to connect to charge the battery 42, whether or not the electric motor 40 is operating. In other embodiments, when the vehicle electric motor 40 is turned off, the solar controller 56 connects switch 55 to allow the solar panel 50 to charge the battery 42, but otherwise disconnects the switch 55 during operation of motor 40 to prevent interference with the hybrid charging system. Solar charging during vehicle operation is beneficial because charging can occur during long stretches of highway driving when no regenerative braking is applied so that the batteries 42 can still be charged and the electric motor 40 used to boost fuel mileage. Although charging of the battery 42 when the vehicle is running is beneficial, charging when the vehicle is turned off is also beneficial, for example when a vehicle is parked at a commuter parking lot all day, or for taxis that may wait in the sun for a long time for a fare, since the battery 42 can be fully charged by solar power for use when the vehicle is later operated.

The solar controller 56 can further function to connect and disconnect the switch 55 to prevent overcharging of the batteries 42. In some embodiments, hysteresis is provided between charge levels of the battery 42 when the solar panel 50 is disconnected and later reconnected. The hysteresis will prevent continuous turn on and turn off of the solar charging system when charging is near a turn on-turn off threshold. In one embodiment, with the vehicle parked for a long period of time, such as a week or more, the controller 56 can monitor charge on the battery 42 and the vehicle operation state and disconnect the switch 55 to turn off the solar charging system until an operator returns to prevent unnecessary charging of the battery 42 that could reduce battery life.

The solar controller 56 can further function to disconnect the switch 55 in one embodiment depending on the amount of sunlight available to enable charging at a sufficient voltage level. Particularly without a charge controller used, as described subsequently, the solar panel controller 56 can connect switch 55 only when sufficient power is provided from the solar panel 50 to provide more efficient battery charging, and to prolong the battery life.

The solar controller 56 can further control the low voltage to high voltage charge circuit 54 when it is a series charger, as described subsequently, to connect the solar panel 50 to successive individual battery cells. If a solar panel angle adjustment device is provided, the controller 56 can further sense the solar charge current provided at different angles and adjust the angle of the solar panel to enable maximum charging.

The solar controller 56 can further operate in conjunction with other charging systems than regenerative braking. For example, an AC wall plug in to an electrical outlet can be provided for nighttime battery charging of the battery 42 that operates in conjunction with the solar charging system. The solar controller 56 can control turn on and turn off of such a separate charging system to prevent overcharge to the battery 42, or damage to the solar charging system.

The solar controller 56 can further divert power from charging a battery to directly power vehicle components, as described subsequently, rather than use the more inefficient charging of batteries. Components such as lights and fans that operate at low voltages (typically operating at 12 volts) in the vehicle can easily be directly solar powered. With a large solar array, or very efficient solar cells in an array, it can be possible to directly power the vehicle electric motor at low speed from the solar panel rather use the more inefficient charging of batteries.

In some embodiments, the solar controller 56 can be combined with the hybrid controller 44 to form a joint controller 60. Although the joint controller 60 provides less total components, the separate solar controller 56 and other solar charging components can easily be added to a hybrid vehicle after market since the hybrid system processor will not need reprogramming or connecting to solar system components.

The solar controller 56 monitors charging of the battery 42 and other conditions of the solar charging system and provides an indication to the solar display 58. In one embodiment, the solar controller 56 is connected by a wire line to the display 58. In another embodiment, the display 58 is provided with a wireless connection to the solar panel controller 56 so that the display 58 can easily be provided in the vehicle passenger compartment as an after market device. In one embodiment a wire line connection to the display 58 is made through the vehicle 12 volt (or other voltage) electrical system through which the solar components can be powered. The solar charging system components including the display 58 can, alternatively, be powered by the solar charging system directly, enabling the solar charging system to be a stand alone device. The solar display 58 can be combined with the hybrid display 46 into a common display 62 to provide fewer system components, although separate displays 58 and 46 can more readily allow the solar charging system to be added after market.

The solar display 58 can provide an indication to the vehicle operator to determine the amount of charge the solar charging system is providing. In this manner, the operator can travel from where sunlight is minimum to an area where sunlight exposure is maximized to enable faster recharging of the batteries. The operator can likewise determine an area to park a vehicle in a commuter lot or other long term parking area where the solar panels of the vehicle will be exposed to the most sunlight absorption to provide full charge to the batteries upon return. Alternatively, the operator can manually adjust an adjustable solar panel 50 for maximum sun exposure, if automatic adjustment is not provided.

The solar display 58 can further provide information such as how much charge has been provided to the battery 42 by the solar charging system. In this manner, for example, an operator could run out of gas with the battery 42 discharged. By waiting for example 30 minutes, the solar charging system can provide sufficient charge to travel to a gas station using battery power alone. The display 58 can further show how long other electrical devices such as the air conditioner will last, particularly valuable where the driver may be stranded in a hot environment. The operator can then choose which electrical system to turn on (such as air conditioning) to save electrical power in a power conservation mode.

The display 58 can further alert the vehicle operator of conditions of the solar panel 50. For instance, if the solar panel 50 is dirty, a detector 61 attached to the solar panel 50 can alert the solar controller 56 so that a notice can be sent to the vehicle operator display 58 for the operator to clean the solar panel. Once sunlight is sufficiently blocked as determined from detector 61, in one embodiment the solar controller 56 can operate a cleaning mechanism 61 provided with the detector (such as a windshield wiper and/or spray cleaner) to cause cleaning of the solar panel 50. Similarly, when solar cells of the solar panel 50 are damaged or otherwise not functioning, the solar controller 56 can monitor their state using monitor 63 and provide an alert to the display 58 telling the operator to replace or repair the nonfunctioning solar cell. In one embodiment, the solar controller 56 can operate bypass switches 63 providing an electrical connection bypass around potentially damaged solar cells to enable monitoring if the cells are non-functional, as well as to allow series connected solar cells in the solar panel 50 to continue to provide charge should one cell fail.

B. Low Voltage to High Voltage Charging Systems

The solar panel 50 with conventional solar cells occupying a small area, such as in a moon roof, may not provide sufficient voltage to allow charging of a high voltage battery 42. Typical solar systems currently available include solar cells of approximately 0.5 volts and a few milliamps per 1 cm square cell. The solar cells are connected in series so that the voltages are added together to form a 6 to 12 volt system, or possibly a larger voltage if space is available where solar cells are placed. Typical hybrid systems used by auto manufacturers include battery packs ranging from approximately 50 volts where the auto engine is not driven by an electric motor, to a 150 volt battery for a small auto driving motor, approximately 350 volts for a higher power motor, and approximately 500 volts for the current highest power motor. Accordingly, as indicated above, in some embodiments of the invention the low voltage to high voltage charge circuit 54 is used to connect the solar panel 50 to the battery 42.

In some embodiments of the present invention, the low voltage to high voltage charge circuit 54 can be a DC-DC converter to take the low voltage (marked 6-12 volts in figures for illustration as a non-limiting example) from a solar panel, and convert to a high voltage (marked 200-300+ volts in figures for illustration also as a non-limiting example) for charging the vehicle battery 42. In other embodiments, the low voltage to high voltage charge circuit 54 can be a series charger, as described to follow, so that the low voltage solar panel 50 is connected individually to each low voltage series cell in the battery to enable battery charging.

1. DC-DC Converter Charging System

Figure 12:
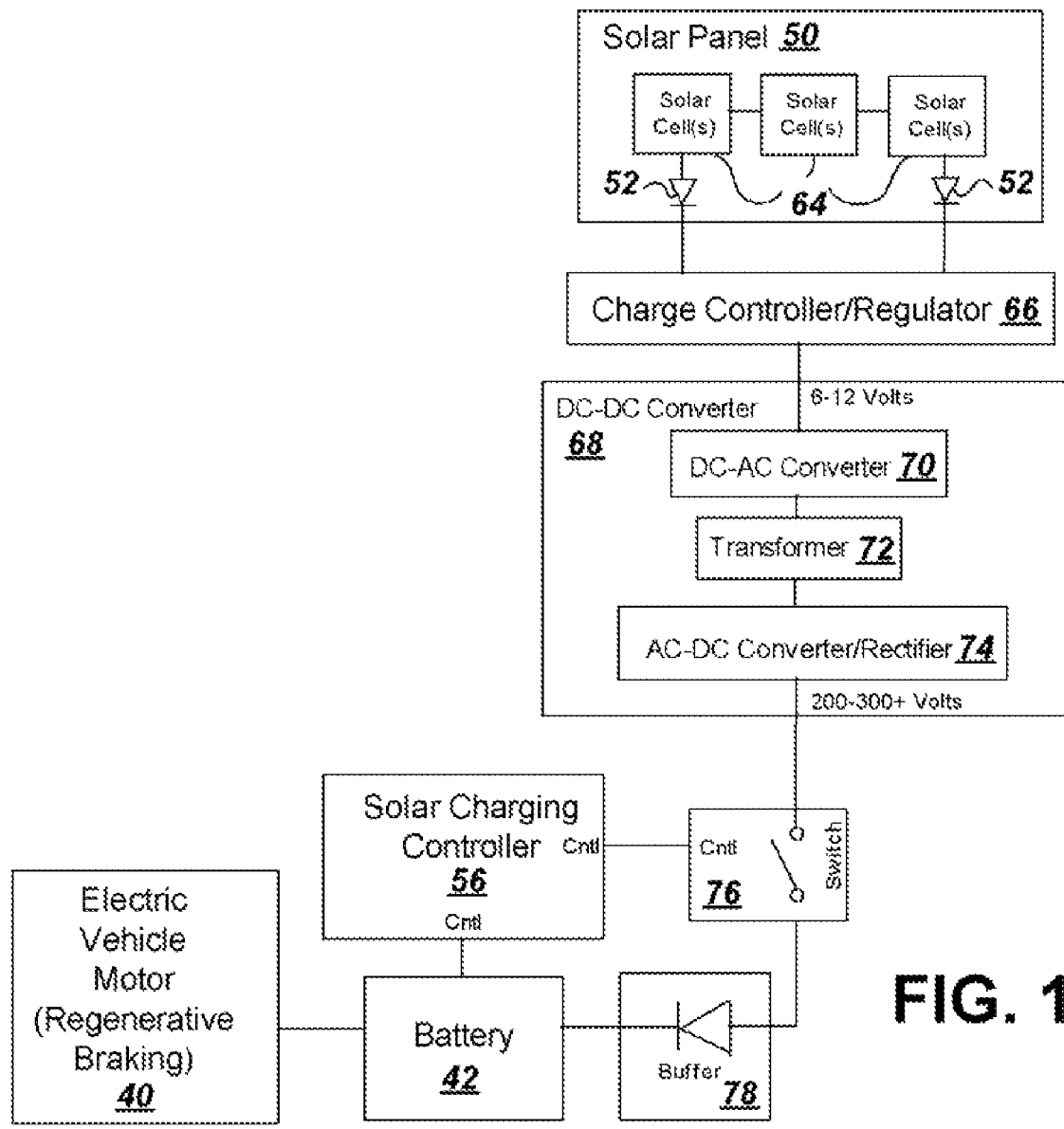
FIG. 12 shows a block diagram for an embodiment of components of a solar battery charging system for use with an electric vehicle with regenerative braking that uses a DC-DC converter to increase voltage from a low voltage solar panel to a high voltage battery.

FIG. 12 illustrates components of a solar charging system using a DC-DC converter 68 for the low voltage to high voltage charge circuit 54 of FIG. 11. The solar charging system includes a solar panel 50 that includes several series connected solar cells 64. Diodes 52 provide buffering in the solar panel to prevent reverse current from flowing through the solar cells 64. Note that components carried over from FIG. 11 are similarly labeled in FIG. 12, as will be components carried over in subsequent drawings.

The charge controller 66 is provided in one embodiment to provide a stable voltage and current from the solar panel 50, since with changing amounts of sunlight different voltage and currents can be provided. The charge controller 66 can provide an output only when sufficient voltage is provided from solar panel 50. Alternatively, the solar panel controller 56 can monitor the solar panel 50 and provide a signal to the charge converter 66 to allow turning on of the charge converter output to subsequent components when sufficient charge is provided from the solar panel 50. Although shown separately, the charge converter 66 can be combined with the DC-DC converter 68.

The DC-DC converter 68 can contain the minimal components shown including: (1) a DC to AC converter or inverter 70, (2) a transformer 72, and (3) an AC to DC converter or rectifier 74. The DC to AC converter 70 serves to convert the low voltage output of the solar panel 50 to an AC signal. The transformer 72 boosts the AC voltage to a higher AC voltage than the battery 42 as necessary to charge the battery 42, and the rectifier 74 converts the high voltage AC to DC to enable charging of the battery 42. Since the regenerative braking charging system between the electric motor 40 and battery 42 will typically use a similar rectifier to rectifier 74, in one embodiment a common rectifier can be used to reduce overall circuitry. Other alternative components known in the art can be used in the DC-DC converter 68.

The solar charging controller 56 is connected to monitor charge on the battery 42 and control switch 76. To prevent overcharging of the battery 42, the solar controller 56 opens the switch 76 to disconnect the solar panel 50. The solar charging controller 56 can further disconnect the switch 76 if charging from the solar panel 50 might interrupt operation of the vehicle, or if significant current from the electric motor might damage components of the solar charging system. As indicated previously, the switch 76 can be moved to an alternative location between the battery 42 and solar panel 50.

A buffer 78 is further shown in FIG. 12 provided between the DC-DC converter 68 and battery 42. This buffer 78 can prevent reverse current flow from the battery 42 that can damage the DC-DC converter 68, particularly during high current charging provided by regenerative braking. Although the buffer 42 is shown, it may be unnecessary if such buffering is provided in the DC-DC converter 68. Similarly, the charge controller 66 may not be necessary if similar circuitry is provided in the DC-DC converter 68.

The high voltage battery 42 in FIG. 12 is created by connecting a large number of smaller batteries in series as shown in FIG. 10. Although shown with a single line, two terminals connect from the solar panel 50 through each component to the battery 42 in FIG. 12. The two terminals from the buffer (or one buffer connecting each terminal) then connect across the end terminals 35 of the battery 42.

2. Series Battery Charger Systems

Figure 13:
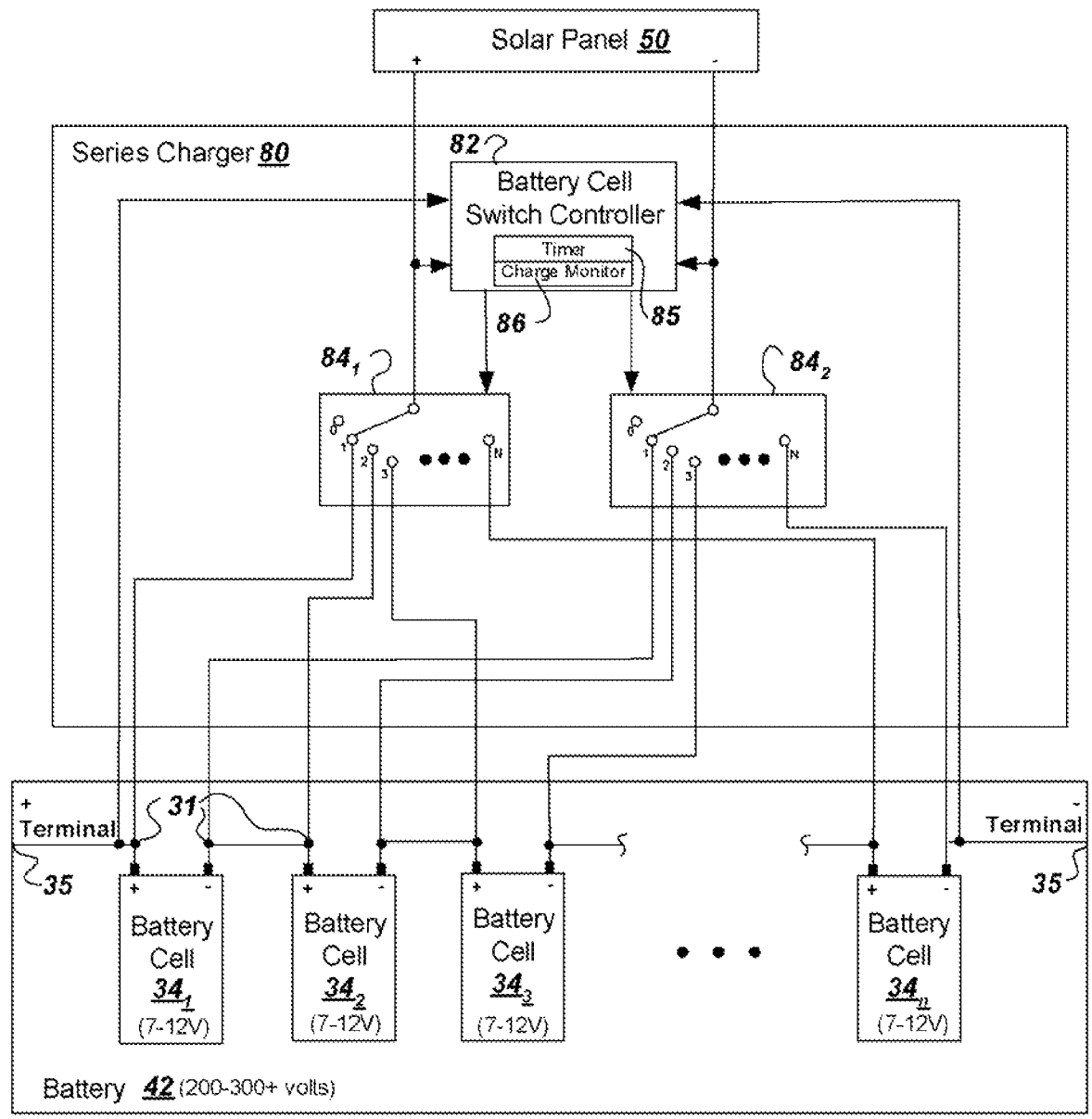
FIG. 13 illustrates a series battery charger used to enable charging of a high voltage battery by a low voltage solar panel.

FIG. 13 illustrates one embodiment of a series battery charger 80 for the low voltage to high voltage charging circuit 54 of FIG. 11. The series battery charger 80 provides an alternative to the less efficient DC-DC converter used in prior art solar charging systems. The DC-DC converter typically will experience less than 80% of the efficiency of a series charger 80 due to the loss through a transformer of the DC-DC converter. The series charger 80 serves to charge a high voltage battery pack 42 (200-300+ volts) made up of series connected battery cells $34_{1-n}$. The individual battery cells $34_{1-n}$ can in one non-limiting example be approximately 10 volts each with thirty connected in series to create a 300 volt battery. The series charger 80 makes a connection in parallel with the series battery cells $34_{1-n}$, one or more at a time using switches $84_1$ and $84_2$ connected to terminals of the solar panel 50. The switches $84_1$ and $84_2$ can be electronic switches, relays, transistors, pass gates, tri-state buffers, or other components known in the art used to accomplish switching.

In operation, during charging by the series charger 80, the solar panel 50 can be connected in parallel across the series connected battery cells $34_{1-n}$ one at a time by moving the position of switches $84_1$ and $84_2$ from position 1, 2, 3 etc. across the battery cells $34_{1-n}$ without any DC-DC conversion. As an alternative to connecting the solar panel 50 across one of the battery cells, the switches $84_1$ and $84_2$ can connect across multiple ones of the battery cells $34_{1-n}$, for example by connecting switch $84_1$ to position 1, while switch $84_2$ is connected at position 2. Although not specifically shown, it is noted that each of the cells $34_{1-n}$ can each include a number of series connected cells. The charging can be performed when the vehicle ignition is off and the electric motor not operating, or when the electric motor is not in use. Charging can also be performed during operation of the vehicle during application of regenerative braking with sufficient buffering applied to the solar panel 50 and components of the series charger 80 if necessary.

The series charger 80 further includes an individual battery cell switch controller 82. The cell switch controller 82 shown includes components to regulate charging of the individual series battery cells $34_{1-n}$. The cell switch controller 82 can monitor charge on a battery cell being charged using a cell charge monitor 86 and control switches $84_1$ and $84_2$ to charge another one of the battery cells when sufficient charging has occurred. Alternatively, the cell charge controller 82 can include a timer 85 and switch from battery cell to battery cell on a timed basis to perform charging. Once all of the cells $34_{1-n}$ are sufficiently charged, as determined by the controller 82 monitoring the terminals 35 of the entire battery 42, the cell switch controller 82 can move the switches $84_1$ and $84_2$ to the open circuit switch position 0 to prevent overcharging of the battery 42. As described previously, hysteresis can be provided with the cell switch controller 82 allowing the battery 42 to discharge below the maximum charge state before the switches $84_1$ and $84_2$ are moved back off of the 0 position to avoid rapid turn on and off of the charging system when full battery charge is reached.

Further, although not shown in FIG. 13, a charge controller regulator such as the regulator 66 described with respect to FIG. 12 can be connected between the solar panel 50 and series charger 80 to maintain a constant charging voltage during operation. Such a regulator can likewise be used in subsequent figures showing series charging systems, although not specifically shown. In one embodiment, the cell switch controller 82 can determine the total voltage produced by the solar panel 50, potentially based a charge regulator output, and adjust the number of the cells $34_{1-n}$ being charged at one time based on the voltage produced from solar panel 50.

Figure 14:
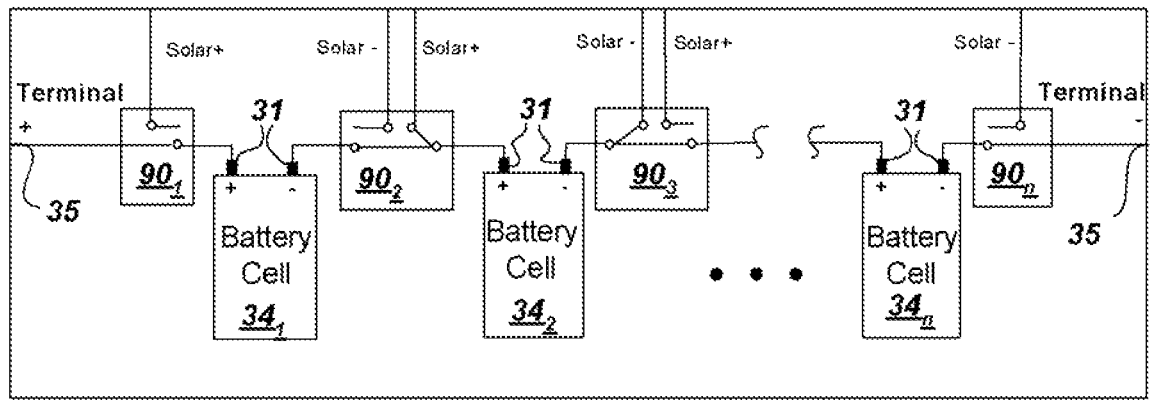
FIG. 14 shows an alternative switch configuration to the configuration of FIG. 13 for a series battery charger.

FIG. 14 shows an alternative to the configuration of switches $84_1$ and $84_2$ of FIG. 13 for a series battery charger. Instead of the two single pole multiple throw switches $84_1$ and $84_2$, the alternative switches include single pole single throw switches $90_{1-n}$ connected to terminals 31 between each one of the cells $34_{1-n}$. Although the end switches $90_1$ and $90_n$ include a single switch, while the middle switches, such as $90_2$, includes two combined switches, it is understood that the middle switches can each be separated into two single pole single throw switches. The switches $90_{1-n}$ selectively connect terminals 31 of the cells $34_{1-n}$ to terminals of the solar panel 50. For purposes of illustration, the cell $34_2$ is shown connected by switches $90_{1-n}$ to the solar panel for charging, while the remaining cells are disconnected. The indications solar– and solar+ show connections to specific terminals of the solar panel 50. The alternative switches $90_{1-n}$ of FIG. 13 and switches $84_1$ and $84_2$ of FIG. 14 illustrate that different switch configurations can be provided to accomplish the same function of connecting the solar panel 50 in parallel across individual ones of the cells $34_{1-n}$, one or more of the cells at a time.

Figure 15:
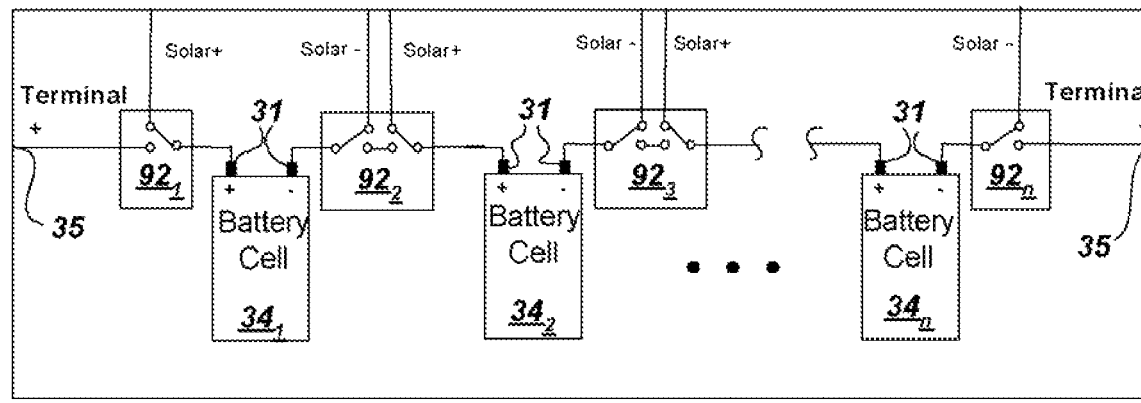
FIG. 15 illustrates an embodiment for a series battery charger wherein the series connection of individual battery cells in a battery pack are broken and the solar panel is connected in parallel with all of the battery cells to enable charging of the battery cells concurrently.

FIG. 15 illustrates an embodiment for a series battery charger wherein connection to the solar panel 50 as well as the series connections of individual battery cells $34_{1-n}$ is made using switches $92_{1-n}$. The switches $92_{1-n}$ are single pole double throw switches (although the middle switches, such as $92_2$, are shown as double pole double throw switches they can be separated into two single pole double throw switches.) The switches $92_{1-n}$ illustrate that the series connection between battery cells $34_{1-n}$ can be broken and a single solar panel 50 connected by its terminals (solar+ and solar–) in parallel across each of the battery cells $34_{1-n}$ to enable charging of all the battery cells $34_{1-n}$ at the same time.

The disconnection of battery cells $34_{1-n}$, as shown in FIG. 15, by switches $92_{1-n}$ can be performed when the vehicle is not in operation to prevent danger of shock from high voltages, even if the solar panel is not charging. In one embodiment, an inertia shock sensor can be used to switch off the series connection, requiring the ignition to turn off and back on to reset. This can remove high voltages that make rescue dangerous after an accident. During operation of the vehicle, the series connections can then be reconnected by switches $92_{1-n}$ to recreate the 200-300+ volt battery output and the solar panel terminals, solar– and solar+, are disconnected from the battery cells $34_{1-n}$ to stop battery charging during vehicle operation.

FIG. 16 illustrates an embodiment for switches $94_{1-n}$ for the series connected battery cells $34_{1-n}$ to disconnect and bypass a battery cell to provide one or more redundant batteries that can be reconnected if another battery cell fails. The switches $94_{1-n}$ include double pole double throw switches. The switches $94_{1-n}$ function to make a series connection between the individual batteries $34_{1-n}$ or connect to a bypass path around individual cells and disconnect the series cell connection. In FIG. 16, battery cell $34_3$ is bypassed by switches $94_3$ and $94_4$, while the remaining battery cells are connected. The switches $94_{1-n}$ in one embodiment can, thus, be switched to bypass a redundant cell that fails to enable the remaining battery cells to be connected in series to provide an operational battery pack even with a failed cell. As indicated previously, a display can then be provided to the vehicle operator to identify the defective battery cell and to indicate it needs replacing. In one embodiment, redundant switches are also provided in case of failure of an individual switch. To provide solar charging, the switches $94_{1-n}$ for the redundant battery can be combined with the switches $84_1$ and $84_2$ of FIG. 13 to selectively charge any of the battery cells $34_{1-n}$, including the redundant cell.

FIG. 17 illustrates modification of the switches providing a redundant battery in FIG. 16 to include connection to a solar panel for charging with solar panel connection switches similar to the configuration of FIG. 14. The modified switches $96_{1-n}$ are double pole triple throw switches to alternatively connect to a battery cell, a bypass around the battery cell, and additionally to the solar panel. As illustrated, the configuration allows for charging of the bypassed battery $34_3$ by connection to the solar panel terminals solar+ and solar–.

In alternative embodiments, combinations of the series charging systems of FIGS. 13-17 can be provided as desired. For example, either of the switching systems for series charging one cell at a time in FIG. 13 or 14 can be combined with the system of FIG. 15 that charges all cells together when the battery cells are not used and are disconnected in series. This combination will still allow charging of the battery cells even when the series connection is made. The system of FIG. 15 that allows charging of all cells together when the battery cells are disconnected can likewise be combined with the redundant cell system of FIG. 16 or 17 to allow disconnection of all cells for safety when the vehicle is not used, as well as to allow charging of all cells together.

For the series charging systems shown in FIGS. 13-17, the switches can be provided on a circuit in the lid of the battery case shown in FIG. 10, or they can be provided in a separate housing with interconnecting wiring. Further, although the series charging systems shown in FIGS. 13-17 are described for use with a solar panel providing charge, the series charger switching systems can be used to charge batteries systems other than solar panels, such as with AC plug in system described subsequently.

C. Additional Solar Charging System Configurations

1. Separate Battery Packs

Figure 18:
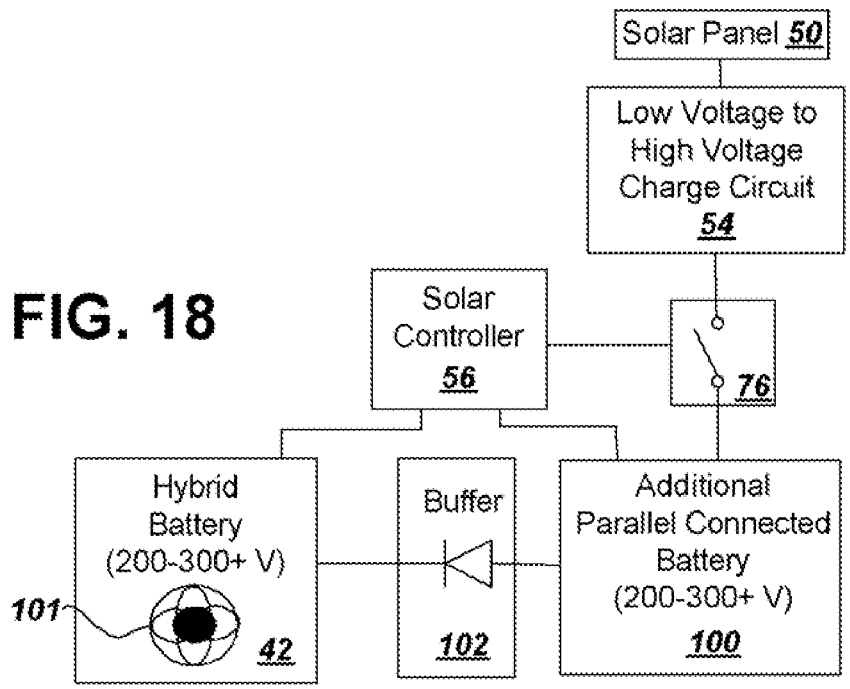
FIG. 18 illustrates components used with a solar system for charging a high voltage battery connected in parallel with a battery charged by regenerative braking.

FIG. 18 illustrates components used with a solar charging system having a separate additional battery 100 connected in parallel with battery 42 and charged by the solar charging system. The solar charging system shown includes a solar panel 50 connected through a low voltage to high voltage charging circuit 54. The low voltage to high voltage charging circuit 54 can be either a DC-DC converter, as described with respect to FIG. 12, or a series charger such as described with respect to FIGS. 13-17. A solar controller 56 monitors solar charging of both batteries 42 and 100 and operates switch 76 to disconnect solar charging to prevent overcharge of the batteries. With a series charger used for the low to high voltage charging circuit 54, the switch 76 will be internally provided and a separate switch will be unnecessary. The additional battery 100 provides added charge storage so that an electric vehicle can travel farther on a full charge. Other features of the additional battery 100 are described to follow.

An added feature in FIG. 18 is that the additional battery 100 can be a lower cost device than battery 42, since the additional battery 100 will not require a cooling system (illustrated by fan 101) to prevent the high regenerative braking charge current from causing overheating if buffer 102 separates the batteries 100 and 42. The regenerative braking charged battery 42 will typically have a cooling system with fans 101 or other components that will be unnecessary with the low current (or trickle) solar charging system. The buffering 102 allows only the solar panel 50 to charge the additional battery 100, since a regenerative braking charging current will blocked by buffer 102 from the additional battery 100. The solar panel 50, however, can provide current through buffer 102 to charge both batteries 42 and 100. If regenerative brake charging is desired for both batteries 100 and 42, buffering 102 can be removed between the two batteries 42 and 100.

A further added feature of the system of FIG. 18 is provided when the low to high voltage charging circuit 54 is a series charger. First, if the battery 42 is not easily accessible to install a switching circuit for the series charger, the series charger can still be easily connected in the added battery 100. Further, with the battery 100 and battery 42 connected in parallel, the series charger can charge an individual cell of battery 42 and as a consequence will provide current to charge all of the series cells of battery 42. With both batteries 42 and 100 connected, and battery 100 charged to the voltage of battery 42, the voltages will equalize when the additional battery 100 is further charged to effectively charge the battery 42. The battery 42 can, thus, be charged by a lower voltage solar panel without requiring series charging of its individual cells or without requiring DC-DC conversion.

2. Low Voltage Vehicle System

Figure 19:
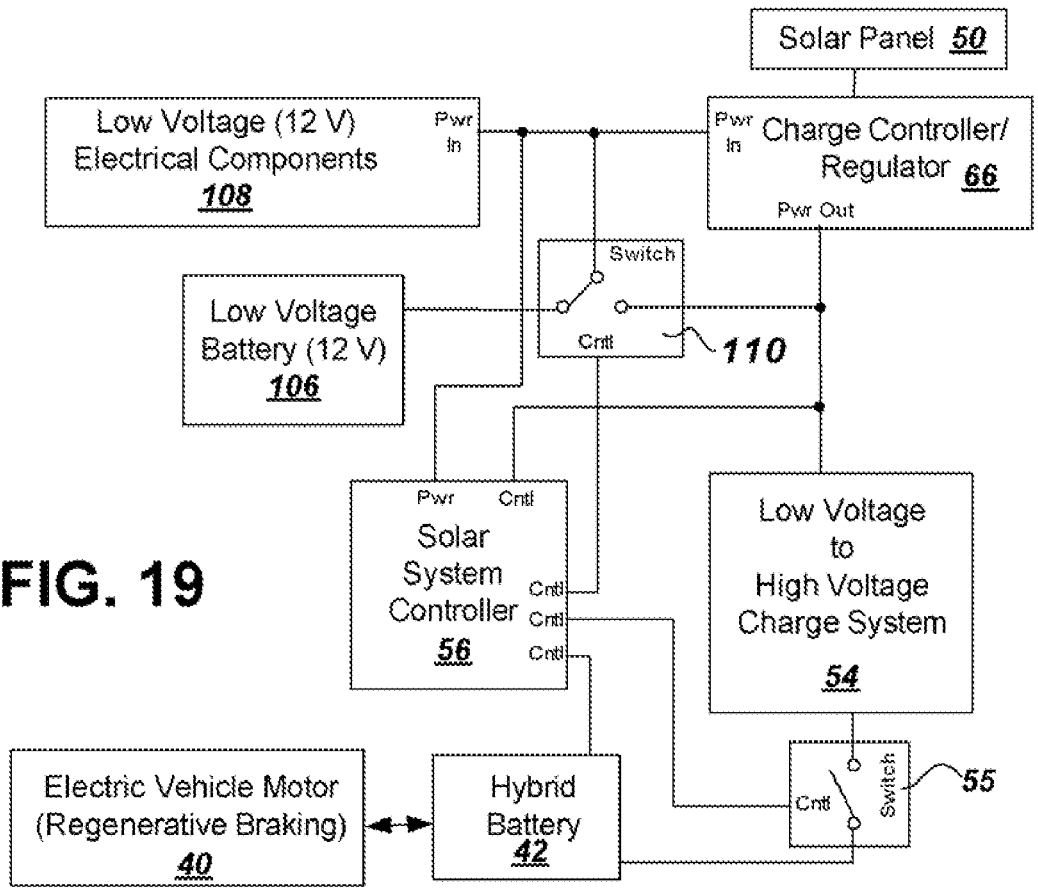
FIG. 19 illustrates a system configured to switch from battery power to the use of solar power to directly power low voltage vehicle components when sufficient sun light is provided.

FIG. 19 illustrates a solar power system configured to provide direct electrical power to low voltage (e.g. 12 volt) components 108 as well as to charge the high voltage battery 42 driving an electric vehicle motor. Low voltage items 108 can for example include the radiator fan, display, air conditioner, heater, and radio that are typically driven by an alternator and battery system. These low voltage components 108 can be directly powered by the solar panel 50, preventing inefficient battery charging.

In the system of FIG. 19, a switch 110 is provided to selectively apply power to the low voltage vehicle components 108 from either the solar panel 50 or a separate low voltage battery 106 when sufficient voltage is not provided from the solar panel 50. Either the low voltage battery 106 or the solar panel 50 can also be connected by switch 100 to charge solar components such as solar controller 56, charge regulator 66 or a solar display (not shown in FIG. 19). The solar panel 50 can further be connected to charge the low voltage battery 106. As an alternative to the low voltage battery 106, a voltage divider can be connected to the battery 42 to power the low voltage components 108 so that the separate battery 106 is not required.

The solar panel 50 in the charging system is shown driving a charge converter 66 that can provide a stable voltage to the low voltage vehicle components 108, as described previously. The solar controller 56 can control switch 110 to apply appropriate power from either the charge converter 66 or low voltage battery 106, while monitoring the state of the solar charging power from charge converter 66 to control switch 110. With insufficient solar power to run charge converter 66, the solar system controller 56 will control switch 110 to use power from the low voltage battery 106.

As in previous systems, the solar controller 56 further monitors the state of the battery 42 and controls the state of switch 55 to prevent overcharge of the battery 42. In combination with direct charging of the low voltage components 108, in one embodiment the solar panel 50 can provide charge through the low to high voltage charge system 54 to charge the battery 42. The low to high voltage charge system 54 can be either a DC-DC converter or a series charger as described previously.

3. AC Plug In Outlet Charger

Figure 20:
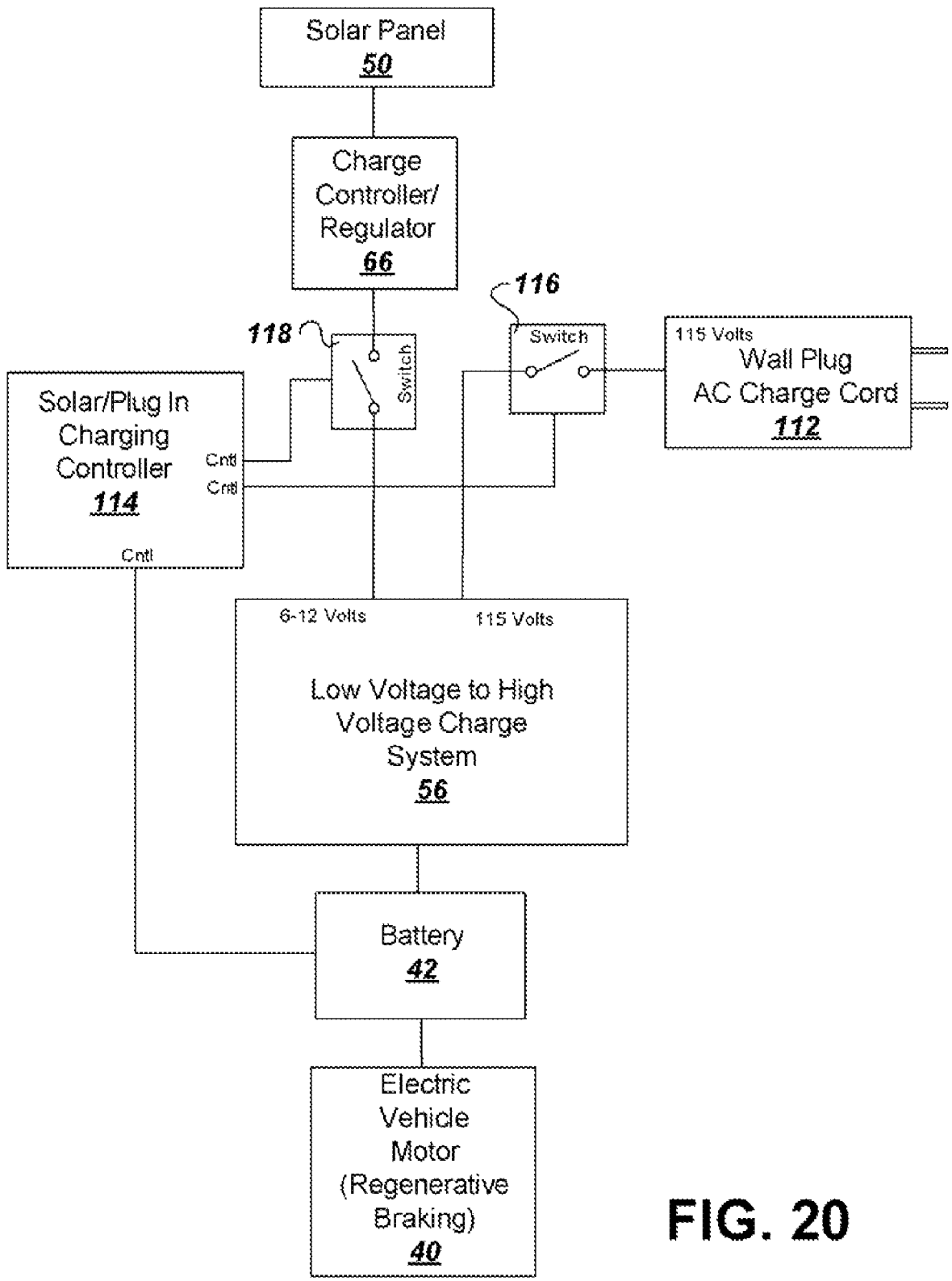
FIG. 20 illustrates components of a solar charging system, where an AC wall outlet plug in is provided in addition to the solar panel to charge the battery, wherein components of the AC charging system can be used in conjunction with the solar panel.

FIG. 20 illustrates components of a solar charging system illustrating that other means can be provided in addition to the solar charging system to charge the battery of a hybrid vehicle. In particular, FIG. 20 illustrates use of an AC plug in connection 112 to a 115 volt or 220 volt 60 Hz, or other AC plug in connection. Assuming the hybrid battery 42 has a higher voltage than the 115 volt or even the 220 volt wall outlet, the plug in connection 112 shown can attach to the low voltage to high voltage charging system 56 along with the solar panel 50. The low voltage to high voltage charging system 56 can be either a DC-DC converter, or a series charger or a combination. With any of these low voltage to high voltage charging systems 56 used, the solar panel 50 and the plug in connection 112 can share some or all components of the system 56.

With the low voltage to high voltage charging system 56 being a DC-DC converter, a transformer (72 of FIG. 12) in the DC-DC converter can be used in common to boost voltage for both the solar panel 50 and the AC plug in connection 112. If the AC wall plug in 112 has an output voltage higher than the DC-AC converter (70 of FIG. 12) connected to the solar panel 50, stepped transformers can be used to boost the lower voltage from the solar panel 50 in the first step so that voltages from the first transformer and the DC-AC converter match, and then a common second transformer can boost the voltages together. Thus, the plug in outlet 112 can be connected for charging and efficiently use components in combination with the solar charging system. In one embodiment, however, separate components are used, particularly if different transformers are desired for the plug in outlet 112 and the solar panel 50.

With the low voltage to high voltage charging system 56 being a series charger, the AC plug in connection 112 can be connected through a rectifier or AC-DC converter to the series charger switches (for example switches $84_1$ and $84_2$ of FIG. 13), similar to the solar panel 50 connection. In this manner, the series charger switches can connect the AC plug in connection 112 to charge one or more battery cells of battery 42 at a time without losses associated with a transformer. With different voltages provided from the solar panel 50 than the plug in connection 112, the switches of the series charger can be controlled to connect to a different number of battery cells to match the charge voltage provided.

A system of FIG. 20 further includes an AC plug in system controller 114 that monitors voltage of battery 42, and controls switches 116 and 118 to prevent overcharging of the battery 42 by either of the solar panel 50 or the AC plug in charger 112. As an alternative, a single switch can replace switches 116 and 118 if the single switch is provided between the low voltage solar charging system 56 and the battery 42.

Although embodiments of the present invention have been described above with particularity, this was merely to teach one of ordinary skill in the art how to make and use the invention. Many additional modifications will fall within the scope of the invention, as that scope is defined by the following claims.

What is claimed is:

1. A solar battery charging system for a vehicle comprising:
    an electric vehicle drive motor for braking and propelling the vehicle;
    a battery connected to the electric vehicle drive motor, the battery comprising a plurality of series connected battery cells;
    a solar panel having an output voltage lower than the voltage of the battery; and a series charger comprising:
    switches that selectively connect terminals of the solar panel in parallel with each of the series connected battery cells; and a switch controller configured to control the switches to separately connect the solar panel in parallel with one of the plurality of battery cells at a time such that the solar panel is directly connected with the one of the plurality of battery cells without coupled through a transformer, while each of the plurality of battery cells remains connected in series, and while the electric vehicle drive motor can act as a generator to supply power to the battery during braking or a load to draw power from the battery during the propelling of the vehicle.

2. The solar battery charging system of claim 1, further comprising:
an AC plug in power source connection having an output voltage when converted to DC lower than the voltage of the battery; and
an AC-DC converter connecting the AC plug in power source connection to the series charger, the AC-DC converter further connecting to the switches of the series charger so that the output of the AC-DC converter is connected to connections for the solar panel to provide charge to the battery cells, one of the cells at a time.

3. The solar battery charging system of claim 1, wherein the switches comprise one or more of tri-state buffers, relays, and transistor pass gates.

4. The solar battery charging system of claim 1, wherein the series charger further comprises:
a timer, wherein the controller is connected to the timer, the solar controller configured to cause the switches to connect the solar panel to different ones of the battery cells at predetermined time intervals measured using the timer.

5. The solar battery charging system of claim 1, wherein the series charger further comprises:
a battery charge monitor, wherein the controller is connected to the battery charge monitor, the solar controller programmed to cause the switches to connect the solar panel to different ones of the battery cells at a predetermined charge level as measured from the battery charge monitor.

6. A solar battery charging system for a vehicle comprising:
an electric vehicle motor for braking and propelling the vehicle;
a battery connected to the electric vehicle motor, the battery comprising a plurality of series connected battery cells;
a solar panel having an output voltage lower than the voltage of the battery; and
a series charger comprising a controller configured to connect the terminals of the solar panel in parallel with one of the plurality of battery cells such that the solar panel is directly connected with the one of the plurality of battery cells without being coupled through a transformer, while the plurality of battery cells remain connected in series, and while the electric vehicle drive motor can act as a generator to supply power to the battery during the braking or a load to draw power from the battery during the propelling of the vehicle.

7. A method of charging a vehicle with an electric motor comprising:
controlling the electric motor to brake and propel the vehicle;
providing a battery connected to the electric motor, the battery having a plurality of series connected battery cells;
providing a solar panel having an output voltage lower than the voltage of the battery; and
connecting the terminals of the solar panel in parallel with one of the plurality of battery cells such that the solar panel is directly connected with the one of the plurality of battery cells without being coupled through a transformer, while the plurality of battery cells remain connected in series, and while the electric vehicle drive motor acts as a generator to supply power to the battery during the braking or a load to draw power from the battery during the propelling of the vehicle.

* * * * *